3,317,988
METHOD FOR FASTENING BLADES INTO
TURBINE ROTORS
Wilhelm Endres, Ennetbaden, Switzerland, assignor to Aktiengesellschaft Brown, Boveri & Cie, Baden, Switzerland, a joint-stock company
Filed Dec. 9, 1963, Ser. No. 329,116
Claims priority, application Switzerland, Dec. 14, 1962, 14,714/62
1 Claim. (Cl. 29—156.8)

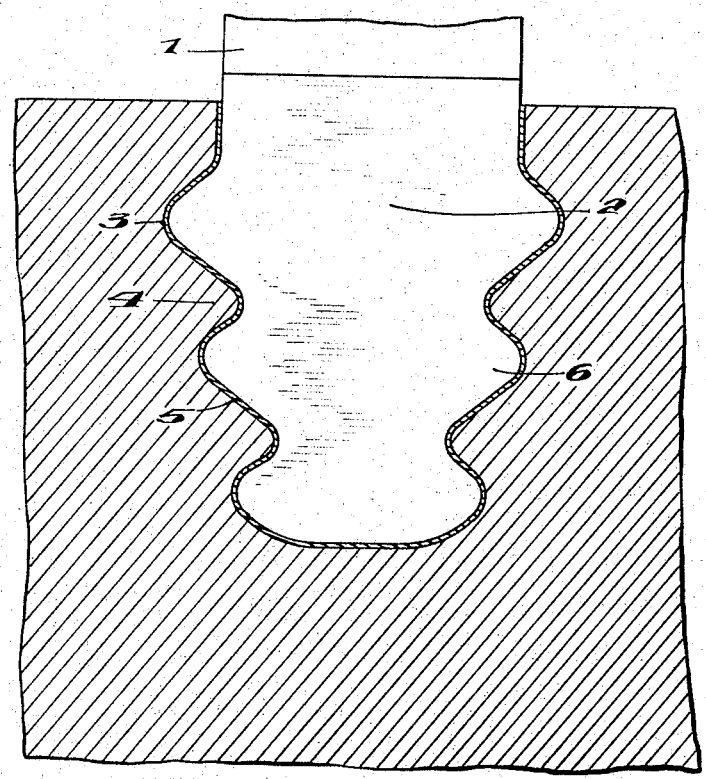

The present invention relates to a method for fastening blades into turbine rotors whereby machining of the blades and rotors occurs with such tolerances, that when assembled, a gap would remain between the blade root and the corresponding part of the rotor groove.

With bladed rotors of turbo machines, and in particular with steam turbines with impulse blading, the problem is to insert the blade roots as firmly as possible into the rotor in order to maintain a well-defined natural frequency and to avoid blade flutter due to variations of the tangential forces.

In practice, different methods of overcoming this problem of flutter have become known, the blades normally being secured mechanically, for example by wedging.

Likewise, for the damping of blade oscillations in axial blowers it has already been tried, in connection with simple blade roots, to embed the blade root into the rotor with graphite dust.

These known designs and methods do not, however, function well with blade turbo-rotors, especially with media at high temperatures. Until now therefore, one has had no alternative method of producing these turbine parts except by accurate machining so that such turbine rotors are excessively costly.

Moreover, with blades having roots of the so-called fir-tree type, that is with serrations which are closely fitted into the rotor grooves, endeavors are made to obtain a uniform load distribution over these serrations. Until now this has been achieved by either overspeeding the rotor, thereby causing plastic deformation of the blade roots, or by very accurate machining.

The general object of the present invention is to provide an improved method for the economical production of turbine rotors. This method according to the invention, is characterized in that an initial gap remains between the root of each blade and the corresponding wall parts of the peripheral groove provided in the rotor, and that such gap is then at least partly filled by means of a heat-resisting mass which is softer than the material from which the blade root is formed, the whole assembly being such that during normal rotation of the turbine rotor the blade root is uniformly loaded and the blade is firmly fixed in the rotor.

This method is suitable especially for impulse wheels, using blades with fir-tree roots, because it make it possible to fasten the blades firmly and to ensure against damage and permanent deformation caused by high tangential forces. It distributes the load evenly over the root serrations, so that the root must not be accurately machined, or deformed through rotor overspeeding.

The accompanying drawings shows a constructional example of how to apply the method in accordance with the invention. Each moving blade 1 is fitted by its fir-tree root 2 into a peripheral groove 3 in the turbine rotor 4. As is evident from the drawing, groove 3 is undercut so as to make it impossible for the blade root 2 to be pulled radially outward from the groove by the centrifugal forces imposed thereon as a result of high speed rotation of the rotor. The tolerances are made sufficiently large so that a gap remains initially between the blade root 2 and its surrounding rotor part, which is then at least partly filled out with a heat resisting mass 5. When the rotor rotates, the blade is pulled outwards—in the drawing upwards—by the centrifugal force and the serrations 6 of the fir-tree root become uniformly loaded.

The present invention possesses the advantage that not only will the blades be very firmly fixed and the separate serrations of the fir-tree roots carry practical equal loads, but these conditions are also approximately fulfilled even when due to differences of temperature or different coefficients of expansion, the blade and root expand differently. Such compensations cannot be attained by accurate machining.

The mass 5 introduced into the gap between the blade root 2 and the corresponding part of the rotor groove 3 should form a layer, preferably remaining under compressive stress.

This mass 5 should then fill the more or less uniform gap between blade root and rotor in order to transfer the forces to the load carrying surfaces. This mass must therefore be softer than the material from when the blade root is manufactured so that the forces are able to balance themselves. The tolerances between the blade root and the rotor groove are relatively large, resulting therefore in economical production of the blades and in a relatively wide gap that has to be filled with the heat-resistant mass.

Likewise, such an intermediate layer can also have a damping effect on any blade oscillations which may occur.

This method can be realized, for example, by filling the gaps between the blade roots and the rotor with iron powder which, when added, is subjected to an artificial oxidation process, for example, by heating. With this oxidation process an expansion, or swelling of the layer substance is achieved so that the blades, although originally fitted loosely into the rotor, after undergoing this process become very firmly fixed and thus have a natural frequency corresponding to lapped-in blade roots of the fir-tree type. With this method, in spite of coarse tolerancing, firm fixing and practical uniform loading of the fir-tree roots is achieved, whereby the oxidized iron dust effectively damps blade oscillations.

In place of the iron powder, other heat resisting metallic powder materials may also be used, for example, copper, nickel, or an alloy of copper and nickel.

It is also posible, before fitting the blade roots into the rotor groove, to coat them by either galvanic or mechanical means, for example, by pressing or by the so-called flame spray depositing method, and then to drive the roots into the grooves whereby, the excess softer material is forced out.

It is also possible, before fitting into the rotor, to connect the packing mass to the blade root by means of a carrier material, whereby the layer should possess sufficient adhesive qualities so as not to become completely stripped from the blade root when it is fitted into the rotor.

This method according to the invention not only applies to blades with fir-tree roots but also to the simpler forms of blading.

I claim:

The method of fastening metallic blades into turbine rotors which comprises the steps of initially dimensioning all surface portions of the root parts of the blades and the corresponding wall surface portions of a peripherally extending undercut groove on the rotor into which the root parts of the blades are inserted with such tolerances that an initial gap would ordinarily remain between all confronting surface portions of the blade root part and groove wall, inserting the root parts of the blades in said groove, filling out said initial gap between all confronting surface portions of said root parts of said blades and the groove wall with a layer of heat-resistant metallic powder softer than the metal from which the root part of the blade is formed, said powder being taken from the group consisting of iron, copper, nickel and nickel-copper alloys, and then subjecting said metallic powder to artificial oxidation thereby expanding said layer and putting the same under compressive stress between said confronting surface portions to rigidly secure the root part of each said blade within said undercut groove and effect uniform loading of the root part of each blade.

References Cited by the Examiner

UNITED STATES PATENTS

| | | | |
|---|---|---|---|
| 649,726 | 5/1900 | Hadaway | 29—155.64 |
| 1,735,831 | 11/1929 | Lightfoot | 29—155.64 |
| 2,000,692 | 5/1935 | Dimberg | 29—156.8 |
| 3,044,687 | 7/1962 | Davey | 29—156.8 X |

JOHN F. CAMPBELL, *Primary Examiner.*

P. M. COHEN, *Assistant Examiner.*